(12) United States Patent
Shang et al.

(10) Patent No.: US 11,294,533 B2
(45) Date of Patent: Apr. 5, 2022

(54) METHOD AND TERMINAL FOR DISPLAYING 2D APPLICATION IN VR DEVICE

(71) Applicant: Huawei Technologies Co., Ltd., Shenzhen (CN)

(72) Inventors: Zeli Shang, Shenzhen (CN); Xiaojuan Li, Beijing (CN); Wenmei Gao, Beijing (CN); Xin Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 16/480,555

(22) PCT Filed: Jun. 9, 2017

(86) PCT No.: PCT/CN2017/087761
§ 371 (c)(1),
(2) Date: Jul. 24, 2019

(87) PCT Pub. No.: WO2018/137304
PCT Pub. Date: Aug. 2, 2018

(65) Prior Publication Data
US 2019/0384482 A1 Dec. 19, 2019

(30) Foreign Application Priority Data

Jan. 26, 2017 (CN) .......................... 201710061842.1

(51) Int. Cl.
*G06F 3/01* (2006.01)
*G06F 3/04815* (2022.01)
(Continued)

(52) U.S. Cl.
CPC .......... *G06F 3/04815* (2013.01); *G06F 3/011* (2013.01); *H04B 1/385* (2013.01);
(Continued)

(58) Field of Classification Search
CPC ...... G06F 3/04815; G06F 9/451; G06F 3/011; G06F 3/0482; H04M 1/72436;
(Continued)

(56) References Cited

U.S. PATENT DOCUMENTS 5,999,660 A 12/1999 Zorin et al.
2010/0241999 A1 9/2010 Russ et al.
(Continued)

FOREIGN PATENT DOCUMENTS

CN 101266546 A 9/2008
CN 102148818 A 8/2011
(Continued)

OTHER PUBLICATIONS

Zha Yufei et al., "Translation for the related part", National Defense Industry Press, Jul. 2015, total 6 pages. With the translation for the related part.
(Continued)

*Primary Examiner* — Marcus Hammonds
(74) *Attorney, Agent, or Firm* — Conley Rose, P.C.

(57) ABSTRACT

A system includes an electronic device and VR glasses. The electronic device receives a notification message in a VR mode. The notification message is designated to be displayed by a first user interface in a normal mode. The electronic device is configured to generate a second interface based on the first interface and display the second interface for displaying the notification message in the VR mode. The electronic device is configured to receive a first user input corresponding to a first location on the second interface. The electronic device is configured to determine a second location on the first interface corresponding to the first location on the second interface to respond to the first user input for interacting with the notification.

16 Claims, 5 Drawing Sheets

(51) Int. Cl.
*H04B 1/3827* (2015.01)
*H04M 1/02* (2006.01)
*H04M 1/72436* (2021.01)
*G06F 3/0482* (2013.01)

(52) U.S. Cl.
CPC ..... *H04M 1/0266* (2013.01); *H04M 1/72436* (2021.01); *G06F 3/0482* (2013.01); *H04B 2001/3866* (2013.01); *H04M 2201/38* (2013.01); *H04M 2201/42* (2013.01); *H04M 2250/54* (2013.01)

(58) Field of Classification Search
CPC .......... H04M 1/0266; H04M 2201/38; H04M 2201/42; H04M 2250/54; H04B 1/385; H04B 2001/3866; G06T 3/0037; G06T 3/00
See application file for complete search history.

(56) References Cited

U.S. PATENT DOCUMENTS

| | | | |
|---|---|---|---|
| 2014/0313197 A1 | 10/2014 | Peuhkurinen | |
| 2015/0177947 A1 | 6/2015 | Shen et al. | |
| 2016/0124499 A1* | 5/2016 | Shiu | G06F 3/011 |
| | | | 715/778 |
| 2016/0180598 A1 | 6/2016 | Rogers et al. | |
| 2016/0335801 A1* | 11/2016 | Yoon | G02B 27/017 |
| 2017/0150139 A1* | 5/2017 | Lee | G06F 3/011 |
| 2018/0018806 A1 | 1/2018 | Li | |
| 2019/0005717 A1* | 1/2019 | Singh | G06F 3/011 |
| 2019/0238821 A1* | 8/2019 | Lee | H04N 13/279 |

FOREIGN PATENT DOCUMENTS

| | | |
|---|---|---|
| CN | 103888654 A | 6/2014 |
| CN | 104731959 A | 6/2015 |
| CN | 105051662 A | 11/2015 |
| CN | 105447898 A | 3/2016 |
| CN | 105637563 A | 6/2016 |
| CN | 105808184 A | 7/2016 |
| CN | 105975179 A | 9/2016 |
| CN | 105975259 A | 9/2016 |
| CN | 106249857 A | 12/2016 |
| GB | 2406768 A | 4/2005 |
| WO | 2009113886 A1 | 9/2009 |

OTHER PUBLICATIONS

Foreign Communication From a Counterpad Application, European Application No. 17893845.2, Extended European Search Report dated Jan. 3, 2020, 10 pages.
Machine Translation and Abstract of Chinese Publication No. CN101266546, Sep. 17, 2008, 14 pages.
Machine Translation and Abstract of Chinese Publication No. CN103888654, Jun. 25, 2014, 15 pages.
Machine Translation and Abstract of Chinese Publication No. CN104731959, Jun. 24, 2015, 25 pages.
Machine Translation and Abstract of Chinese Publication No. CN105808184, Jul. 27, 2016, 12 pages.
Sina Technology, "Detailed explanation of Google VR platform Daydream: there is a handle is not the same," May 24, 2016, 7 pages.
English Translation of Sina Technology, "Detailed explanation of Google VR platform Daydream: there is a handle is not the same," May 24, 2016, 10 pages.
Foreign Communication From a Counterpart Application, PCT Application No. PCT/CN2017/087761, English Translation of International Search Report dated Aug. 30, 2017, 2 pages.
Foreign Communication From a Counterpart Application, PCT Application No. PCT/CN2017/087761, English Translation of Written Opinion dated Aug. 30, 2017, 4 pages.
Machine Translation and Abstract of Chinese Publication No. CN102148818, Aug. 10, 2011, 11 pages.
Machine Translation and Abstract of Chinese Publication No. CN105975179, Sep. 28, 2016, 17 pages.
Machine Translation and Abstract of Chinese Publication No. CN105975259, Sep. 28, 2016, 21 pages.
Machine Translation and Abstract of Chinese Publication No. CN106249857, Dec. 21, 2016, 44 pages.
Foreign Communication From a Counterpart Application, Chinese Application No. 201780005046.4, Chinese Office Action dated Nov. 27, 2019, 13 pages.

* cited by examiner

METHOD AND TERMINAL FOR DISPLAYING 2D APPLICATION IN VR DEVICE

CROSS-REFERENCE TO RELATED APPLICATIONS

This application is a national stage application of International Application No. PCT/CN2017/087761, filed on Jun. 9, 2017, which claims priority to Chinese Patent Application No. 201710061842, filed on Jan. 26, 2017. Both of the aforementioned applications are hereby incorporated by reference in their entireties.

TECHNICAL FIELD

This application specifically relates to the field of virtual reality technologies, and in particular, to a method and a terminal for displaying a 2D application in a VR device.

BACKGROUND

Virtual reality (virtual reality, VR) is a simulation system that generates a three-dimensional virtual world through computer simulation and provides simulation of senses such as sight, hearing, and touch.

At present, if a VR technology needs to be used, a VR version required by the corresponding VR technology needs to be developed on a terminal, so that the VR technology can be used to display and perform an operation on an application on the terminal. Applications on a terminal supporting the VR technology include three-dimensional (3 dimensions, 3D) applications and two-dimensional (2 dimensions, 2D) applications. It can be learned from the foregoing that running rules of a three-dimensional application and a two-dimensional application are different. The VR system is mainly designed for a 3D mode. Therefore, generally, an application in a 2D mode cannot be displayed or operated on a terminal (for example, VR glasses) supporting the VR technology.

SUMMARY

Embodiments of this application provide a method and a terminal for displaying a 2D application in a VR device. When viewing, by using VR glasses, a 2D application on a terminal supporting a VR technology, a user can display and perform an operation on the 2D application on the terminal without taking the terminal out of the VR glasses.

According to a first aspect, an embodiment of this application provides a method for displaying a 2D application in a VR device, including: determining, by a terminal in a VR mode, a first notification interface in a normal mode, where the first notification interface includes a notification message, and the notification message is from a 2D application; determining, by the terminal in the VR mode, a second notification interface based on the first notification interface, and displaying, in the VR mode, the second notification interface; determining, by the terminal in the VR mode, a user operation, where a touch point of the user operation is located on the second notification interface, and location information of the touch point on the second notification interface is first location information; and determining, by the terminal in the VR mode, second location information based on the first location information, so that the 2D application responds to the user operation based on the second location information, where the second location information is location information on the first notification interface. According to this embodiment of this application, the terminal processes, in the VR mode, the notification message in the normal mode from the 2D application, where the processed message may be displayed and operated in the VR mode; and then determines, in the VR mode, the second location information based on the first location information, so that the 2D application responds to the user operation based on the second location information. The terminal projects the user operation interface onto a 3D interface of VR glasses, so that a user can display and perform an operation on the 2D application on the terminal without taking the terminal out of the VR glasses.

In an optional implementation, the method of "determining, by a terminal in a VR mode, a first notification interface in a normal mode" may further include: determining, by the terminal in the VR mode, the notification message; and determining, by the terminal, the first notification interface in the normal mode.

In another optional implementation, the method of "determining, by the terminal in the VR mode, a second notification interface based on the first notification interface, and displaying, in the VR mode, the second notification interface" may include: mapping, by the terminal, the first notification interface to a 3D model, to determine the second notification interface; and displaying, by the terminal in the VR mode, the second notification interface.

In still another optional implementation, the terminal maps, in the VR mode, the first notification interlace to some or all areas of the 3D model. In yet another optional implementation, the method of "determining, by the terminal in the VR mode, second location information based on the first location information, so that the 2D application responds to the user operation based on the second location information" may include: the first location information is 3D coordinates of the touch point; and the second location information is 2D coordinates on the first notification interface. After the first location information is mapped to the 3D model in the VR mode, 3D data can be obtained. Then, the 3D data is projected into the VR glasses. Through this process, a 2D application on a terminal supporting a VR technology can be displayed in a 2D mode.

In still yet another optional implementation, the terminal determines, in the VR mode, the 2D coordinates on the first notification interface by mapping the 3D coordinates.

According to a second aspect, an embodiment of this application provides a terminal for displaying a 2D application in a VR device, where the terminal includes: a processor, configured to determine, in a VR mode, a first notification interface in a normal mode, where the first notification interface includes a notification message, and the notification message is from a 2D application, where the processor is further configured to determine, in the VR mode, a second notification interface based on the first notification interface; and a display, configured to display, in the VR mode, the second notification interface, where the processor is further configured to determine, in the VR mode, a user operation, where a touch point of the user operation is located on the second notification interface, and location information of the touch point on the second notification interface is first location information; and the processor is further configured to determine, in the VR mode, second location information based on the first location information, so that the 2D application responds to the user operation based on the second location information, where the second location information is location information on the first notification interface. According to this embodiment of this application, the processor processes, in the VR mode, the notification message in the normal mode from the 2D application, where the processed message may be displayed and operated in the VR mode; and then the processor determines, in the VR mode, the second location information based on the first location information, so that the 2D application responds to the user operation based on the second location information. A transceiver projects the user operation interface onto a 3D interface of VR glasses, so that a user can display and perform an operation on the 2D application on the terminal without taking out the terminal.

In an optional implementation, the transceiver is configured to determine, in the VR mode, the notification message, where the notification message is from the 2D application; and the processor is further configured to determine the first notification interface in the normal mode, where the first notification interface includes the notification message.

In another optional implementation, the processor is further configured to: map the first notification interface to a 3D model, to determine the second notification interface; and display, in the VR mode, the second notification interface.

In still another optional implementation, the processor is further configured to map, in the VR mode, the first notification interface to some or all areas of the 3D model.

In yet another optional implementation, the first location information is 3D coordinates of the touch point, and the second location information is 2D coordinates on the first notification interface. The processor maps the first location information to the 3D model in the VR mode, to obtain 3D data, and projects the 3D data into the VR glasses. Through this process, a 2D application on a terminal supporting a VR technology can be displayed in a 2D mode.

In still yet another optional implementation, the processor is further configured to determine, in the VR mode, the 2D coordinates on the first notification interface by mapping the 3D coordinates.

According to a third aspect, an embodiment of this application provides a computer-readable storage medium, where the computer-readable storage medium stores an instruction, and when the instruction runs on a computer, the computer executes the method in the foregoing aspects.

According to a fourth aspect, an embodiment of this application provides a computer program product including an instruction, where when the product runs on a computer, the computer executes the method in the foregoing aspects.

BRIEF DESCRIPTION OF DRAWINGS

The following describes the embodiments of this application in detail with reference to accompanying drawings.

DESCRIPTION OF EMBODIMENTS

To facilitate understanding of the embodiments of the present invention, the following provides further explanations and descriptions with reference to the accompanying drawings by using specific embodiments. The embodiments do not constitute any limitation on the embodiments of the present invention.

The embodiments of the present invention provide a method and a terminal for displaying a 2D application in a VR device. A notification message is mapped in a VR mode to a 3D model; a touch operation of a user in the 3D model is determined; and the touch operation of the user in the 3D model is mapped to a first notification interface (namely, an interface of a 2D application), so that the 2D application responds to the operation of the user. This resolves a problem that a VR device cannot provide functions for displaying and performing a corresponding operation on a 2D application.

Figure 1:
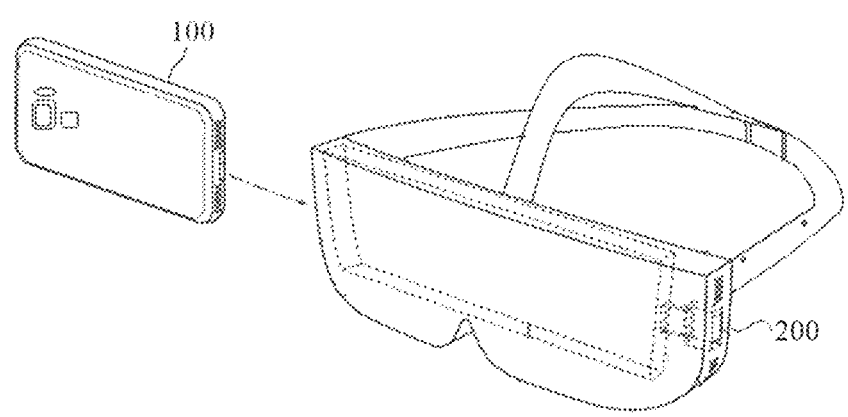
FIG. 1 is a schematic architecture diagram of a terminal and a device according to an embodiment of the present invention.

FIG. 1 is a schematic architecture diagram of a terminal and a device according to an embodiment of the present invention. As shown in FIG. 1, an application scenario includes a terminal and a VR device. The terminal includes a mobile phone 100, and the VR device includes VR glasses 200.

Specifically, the terminal may include at least a memory, a touchscreen, and a processor. The memory may be configured to store a software program; the processor executes various functions of the terminal by running the software program stored in the memory; and the touchscreen may be configured to display information entered by a user, information provided for a user, and various menus of the terminal, and may also accept user input. For ease of description, in this application, the following provides a specific description by using an example in which the terminal is a mobile phone. A status of the mobile phone 100 is set to a VR mode, and the mobile phone 100 is placed into the VR glasses 200. An external device (for example, a Bluetooth handle) is used to perform an operation on a 2D application on the mobile phone 100 and project the 2D application to a 3D interface of the VR glasses. Specifically, the display method provided in the embodiments of the present invention is performed in the VR mode.

Figure 2:
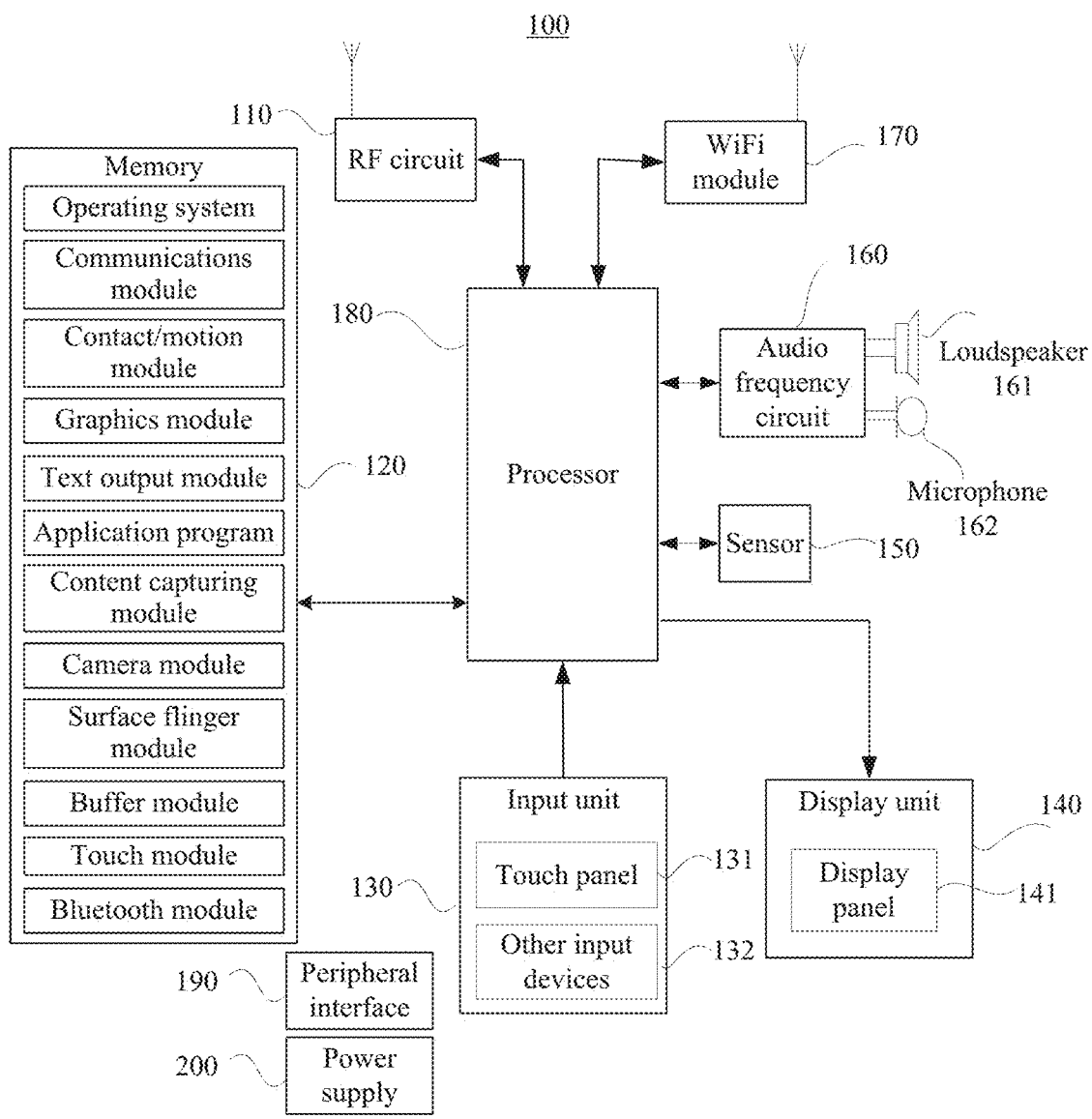
FIG. 2 is a schematic structural diagram of a terminal according to an embodiment of the present invention.

FIG. 2 is a schematic structural diagram of a terminal according to an embodiment of the present invention. FIG. 2 is a schematic structural diagram of a mobile phone related to this embodiment of this application. As shown in the block diagram of a part of a structure of the mobile phone 100 in FIG. 2, the mobile phone 100 includes a radio frequency (radio frequency, RF) circuit 110, a memory 120, an input unit 130, a display unit 140, a sensor 150, an audio frequency circuit 160, a Wireless Fidelity (wireless fidelity, WiFi) module 170, a processor 180, and a power supply 190. A person skilled in the art may understand that the mobile phone structure shown in FIG. 1 does not constitute a limitation on the mobile phone, and the mobile phone may include more or fewer components than those shown in the diagram, or a combination of some components, or the components disposed differently.

The following describes each component of the mobile phone 100 in detail:

The RF circuit 110 may be configured to: receive and send information, or receive and send a signal during a call. The RF circuit 110 receives downlink information of a base station, and sends the downlink information of the base station to the processor 180. The server processes the downlink information. In addition, the RF circuit 110 may also send uplink data to the base station. Generally, the RF circuit includes but is not limited to an antenna, at least one amplifier, a transceiver, a coupler, a low noise amplifier (low noise amplifier, LNA), a duplexer, and the like. In addition, the RF circuit 110 may further communicate with a network and/or another device through wireless communication. Any communications standard or protocol may be used for wireless communication, including but not limited to Global System for Mobile Communications (global system of mobile communication, GSM), general packet radio service (general packet radio service, GPRS), Code Division Multiple Access (code division multiple access, CDMA), Wideband Code Division Multiple Access wideband code division multiple access, WCDMA), Long Term Evolution (long term evolution, LTE), an e-mail, a short message service (short messaging service, SMS), and the like.

The memory 120 may be configured to store a software program and a module. Generally, the memory 120 includes but is not limited to an operating system, a communications module, a contact/motion module, a graphics module, a text output module, an application program, a content capturing module, a camera module, a surface flinger module (surface flinger module), a buffer module (buffer module), a touch module (touch module), a Bluetooth module, and the like. In addition, the memory 120 may mainly include a program storage area and a data storage area. The program storage area may store an operating system, an application program required by at least one function (such as an audio playback function or an image playback function), and the like. The data storage area may store data (such as audio data and a phone book) created based on use of the mobile phone 100, and the like. The memory 120 may further include a high-speed random access memory, and may further include a non-volatile memory such as at least one disk storage device, a flash memory device, or another volatile solid-state storage device. In addition, the contact/motion module included in the memory 120 is configured to: detect contact of an object or a finger with a touchscreen 140 or a click wheel; capture a speed (a direction and a magnitude) and an acceleration (a change in the magnitude or direction) of the contact; and determine a type of a contact event. For example, the contact/motion module further includes a plurality of types of contact event detection modules: a calculation module (a figure-down module or a figure-up module), a figure-dragging module (figure-dragging module), and a figure-tap module (figure-tap module). Sometimes, a gesture, for example, finger pinching/depinching (finger pinching/depinching), is used with an element on a UI interface to implement some operations.

The Bluetooth module is configured to connect to an external device. The external device performs an operation on the mobile phone by using the Bluetooth module, and the external device includes a device, such as a Bluetooth handle, that can remotely control the mobile phone.

The graphics module is configured to render and display graphics on a touchscreen or another display. The graphics include web pages, icons, digital images, videos, and animations.

Application programs may include a contacts application, a phone application, a video conferencing application, an email client, an instant communication application, a personal sports application, a camera application, an image management application, a video player, a music player, a calendar application, a plug-in (a weather plug-in, a stock plug-in, a calculator plug-in, a clock plug-in, or a dictionary plug-in), a custom plug-in, a search application, a notes application, a map application, an online video application, and the like.

The input unit 130 may be configured to: receive entered numeral or character information, and generate key signal input related to user settings and function control of the mobile phone 100. The input unit 130 may include a touch panel 131 and other input devices 132. The touch panel 131, also referred to as a touchscreen, may collect a touch operation performed by a user on or near the touch panel 131 (for example, an operation performed on the touch panel 131 or near the touch panel 131 by the user by using any suitable object or accessory such as a finger or a stylus), and drive a corresponding connection apparatus according to a preset program. In addition, the touch panel 131 may further include two parts: a touch detection apparatus and a touch controller. The touch detection apparatus detects a touch position of the user, detects a signal generated by a touch operation, and transmits the signal to the touch controller. The touch controller receives touch information from the touch detection apparatus, converts the touch information into touch point coordinates, and sends the touch point coordinates to the processor 180; and can receive a command sent by the processor 180 and execute the command. Specifically, the touch panel 131 may be implemented in various types, such as a resistive type, a capacitive type, an infrared type, and a surface acoustic wave type. In addition to the touch panel 131, the input unit 130 may further include the other input devices 132. The other input devices 132 may include but are not limited to one or more of a physical keyboard, a function key (such as a volume control key or an on/off key), a trackball, a mouse, a joystick, and a Bluetooth handle.

The display unit 140 may be configured to display information entered by the user or information provided for the user and various menus of the mobile phone 100. The display unit 140 may include a display panel 141. The display panel 141 may be configured in a form of a liquid crystal display (liquid crystal display, LCD), an organic light-emitting diode (organic light-emitting diode, OLED), or the like. Further, the touch panel 131 may cover the display panel 141. After detecting a touch operation on or near the touch panel 131, the touch panel 131 sends the touch operation to the processor 180 to determine a type of a touch event. Then, the processor 180 provides corresponding visual output on the display panel 141 based on the type of the touch event. In FIG. 1, the touch panel 131 and the display panel 141 are used as two separate components to implement input and output functions of the mobile phone 100. However, in some embodiments, the touch panel 131 and the display panel 141 may be integrated to implement the input and output functions of the mobile phone 100.

The mobile phone 100 may further include at least one sensor 150, such as a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the mobile phone 100 moves to an ear. As a type of motion sensor, an accelerometer sensor can detect values of accelerations in all directions (usually three axes), can detect a value and a direction of gravity when the mobile phone is static, and can be applied to an application for identifying a mobile phone posture (such as switching between a landscape mode and a portrait mode, a related game, or magnetometer posture calibration), a vibration-recognition-related function (such as a pedometer or a tap), and the like. For another sensor that may be further configured in the mobile phone 100, such as a gyroscope, a barometer, a hygrometer, a thermometer, or an infrared sensor, details are not described herein.

The audio frequency circuit 160, a loudspeaker 161, and a microphone 162 may provide an audio interface between the user and the mobile phone 100. The audio frequency circuit 160 may transmit, to the loudspeaker 161, an electrical signal converted from received audio data, and the loudspeaker 161 converts the electrical signal into a sound signal for outputting. In addition, the microphone 162 converts a collected sound signal into an electrical signal, and the audio frequency circuit 160 receives the electrical signal and converts the electrical signal into audio data, and then outputs the audio data to the RF circuit 110, so that the audio data is sent to, for example, another mobile phone, or the audio data is output to the memory 120 for further processing.

WiFi (wireless fidelity, WiFi) is a short-range wireless transmission technology. By using the WiFi module 170, the mobile phone 100 can help the user receive and send an email, browse a web page, access streaming media, and the like. The WiFi module 170 provides the user with wireless broadband access to the Internet. Although FIG. 1 shows the WiFi module 170, it can be understood that the WiFi module 170 is not a necessary part of the mobile phone 100 and may certainly be omitted as required provided that the essence of the present invention is not changed.

The processor 180 runs the software program and the module stored in the memory 120, to implement various function applications of the mobile phone 100 and process data. The processor 180 is a control center of the mobile phone 100, connects all parts of the entire mobile phone by using various interfaces and lines, and implements various functions of the mobile phone 100 and processes data by running or executing the software program and/or the module stored in the memory 120 and invoking the data stored in the memory 120, so as to perform overall monitoring on the mobile phone, Optionally, the processor 180 may include one or more processing units. An application processor and a modem processor may be integrated into the processor 180. The application processor mainly processes an operating system, a user interface, an application program, and the like. The modem processor mainly processes wireless communication. It can be understood that the modem processor may also be not integrated into the processor 180.

The mobile phone 100 further includes the power supply 200 (such as a battery) that supplies power to the components. The power supply may be logically connected to the processor 180 by using a power management system, so as to implement functions such as charge management, discharge management, and power consumption management by using the power management system. Although not shown, a camera and the like may be further included in the mobile phone 100, and details are not described herein.

Figure 3:
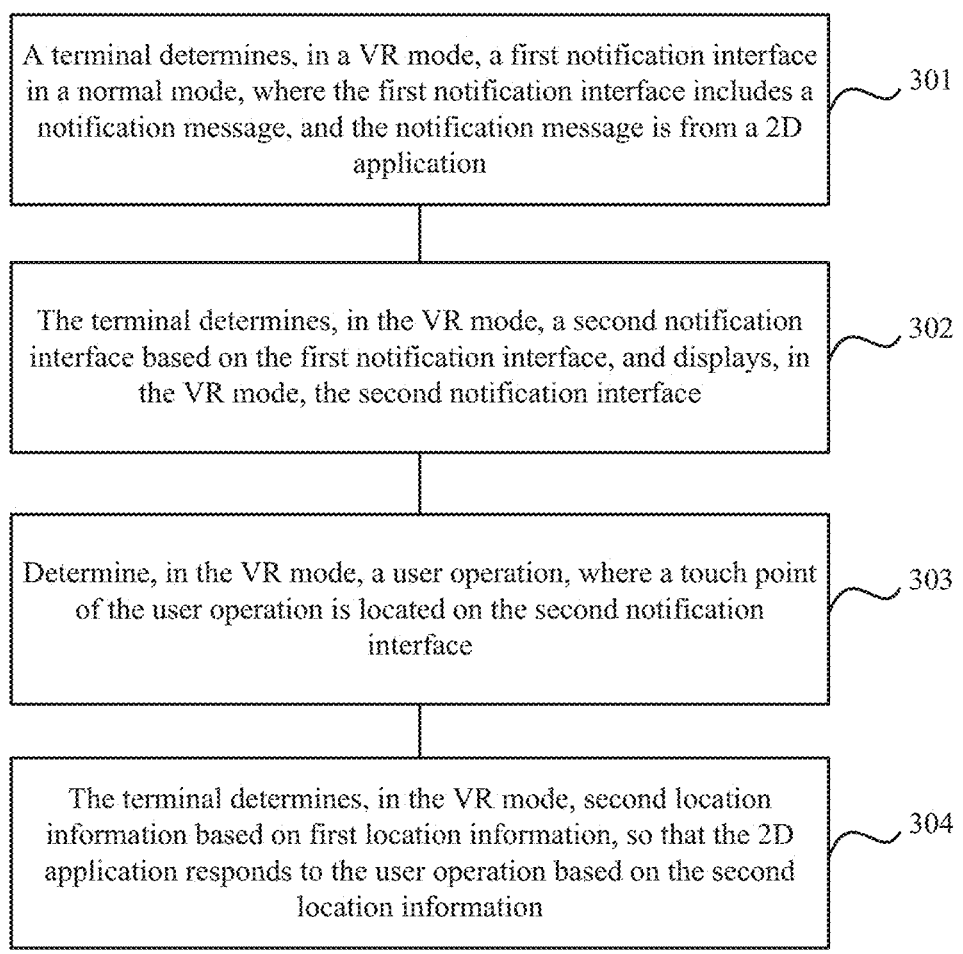
FIG. 3 is a schematic flowchart of a method for displaying a 2D application in a VR device according to an embodiment of the present invention.
Figure 7:
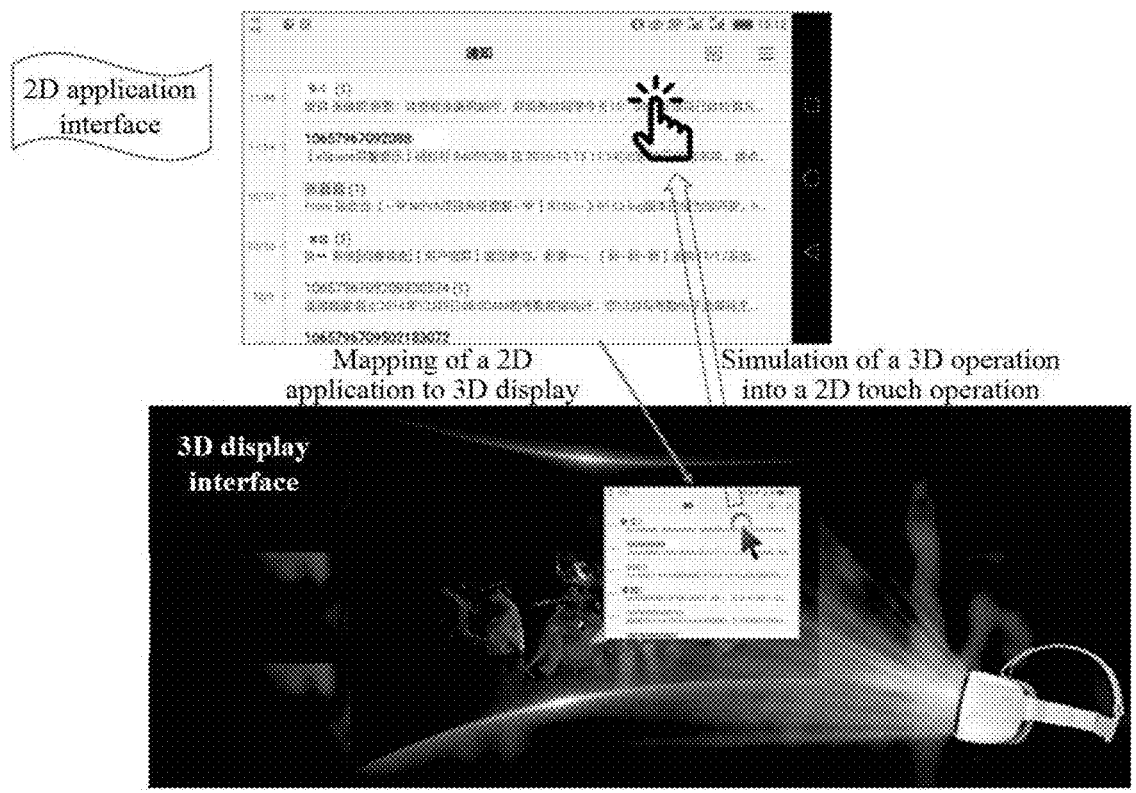
FIG. 7 is an implementation effect view of displaying a 2D application in a VR device according to an embodiment of the present invention.

The following embodiments provide detailed descriptions with reference to FIG. 3 and FIG. 7. FIG. 3 is a schematic flowchart of a method for displaying a 2D application in a VR device according to an embodiment of the present invention. FIG. 7 is an implementation effect view of displaying a 2D application in a VR, device according to an embodiment of the present invention. A user may first set start VR mode for a terminal (for example, the mobile phone 100 shown in FIG. 1), and then place the mobile phone in the VR mode into VR glasses. Steps for starting the VR mode may include the following: before the VR glasses are connected to the mobile phone, selecting "start VR mode" on the mobile phone; When the VR glasses are connected to the mobile phone, the mobile phone starts the VR mode by detecting a connection signal; and when the VR glasses are connected to the mobile phone, inputting a signal by using an input unit of the VR glasses to select "start VR mode". As shown in FIG. 3, the method for displaying a 2D application in a VR device specifically includes the following steps.

S301. The terminal determines, in the VR mode, a first notification interface in a normal mode, where the first notification interface includes a notification message, and the notification message is from a 2D application.

Specifically, the terminal determines, in the VR mode, the notification message, and the terminal determines the first notification interface in the normal mode. It should be noted that, in this embodiment provided by the present invention, the 2D application may be understood as an application in the normal mode.

In the VR mode, a graphics system of the terminal and various devices (for example, VR glasses) that provide a VR technology may be used together, to provide an interactive three-dimensional environment for the user. In the normal mode, the graphics system of the terminal may be used to provide image information for the user and interact with the user. In other words, when the terminal is in the normal mode, the user can implement interaction without using the VR glasses; and when the terminal is in the VR mode, the user sees virtual three-dimensional image information by using the VR glasses, and can implement interaction by using the virtual three-dimensional image information. The normal mode may also be referred to as a non-VR mode.

In a possible embodiment, the surface flinger module in the processor 180 shown in FIG. 2 receives the notification message, and the surface flinger module determines whether the notification message is from the 2D application.

If the notification message is from a 3D application, the surface flinger module sends the notification message from the 3D application to the buffer module in the processor 180 shown in FIG. 2, and the buffer module stores the notification message and directly projects the notification message onto a 3D interface of the VR glasses 200 shown in FIG. 1. At this time, a 3D model of any application is stored in a system of the mobile phone, and a 3D model of at least one of the any application is displayed in the current VR mode.

If the notification message is from the 2D application, S302 is performed.

S302. The terminal determines, in the VR mode, a second notification interface based on the first notification interface, and displays, in the VR mode, the second notification interface.

Specifically, the terminal maps the first notification interface to a 3D model, to determine the second notification interface; and the terminal displays, in the VR mode, the second notification interface.

In a possible embodiment, the surface flinger module receives the notification message from the 2D application and determines the 2D notification interface on which the notification message of the 2D application is located, where the 2D notification interface includes the notification message from the 2D application.

For example, if the 2D application is a gallery, and the notification message is a screen capture instruction, the following steps are performed: The surface flinger module receives the screen capture instruction from the gallery application, and determines a screenshot to be captured according to the screen capture instruction. The surface flinger module obtains coordinates of the screenshot.

In a possible embodiment, the terminal maps the 2D notification interface to the 3D model in the VR mode.

Specifically, the surface flinger module maps the 2D notification interface to the 3D model in the VR mode. The terminal maps, in the VR mode, the first notification interface to some or all areas of the 3D model. Mapping in this step may be understood as mapping, in the VR mode, the 2D notification interface to the 3D model.

The surface flinger module obtains 3D data, in the 3D model, corresponding to the 2D notification interface.

The surface flinger module sends the corresponding 3D data to the buffer module in the processor shown in FIG. 2, and the buffer module stores the 3D data and directly projects the 3D data onto the 3D interface of the VR glasses 200 shown in FIG. 1.

For example, the surface flinger module maps the screenshot to the 3D model in the VR mode, or in other words, establishes a correspondence between the coordinates of the 2D screenshot and coordinates of the 3D model. The terminal maps, in the VR mode, the first notification interface to some or all areas of the 3D model.

The surface flinger module sends the 3D data corresponding to the screenshot to the buffer module in the processor shown in FIG. 2, and the buffer module stores the 3D data and directly projects the 3D data onto the 3D interface of the VR glasses 200 shown in FIG. 1.

S303. The terminal determines, in the VR mode, a user operation, where a touch point of the user operation is located on the second notification interface, and location information of the touch point on the second notification interface is first location information.

Specifically, the terminal determines, in the VR mode, an operation instruction of the user for the terminal, and the terminal determines, based on a location of the touch point of the user operation, whether the 2D application should respond to the operation instruction. In addition, the VR glasses may also determine the user operation.

If the touch operation of the user is on an interface of the 3D application, the touch module in the processor 180 shown in FIG. 2 responds to the operation instruction, and the 3D application performs a corresponding operation according to the operation instruction.

If the touch point of the user operation is located on the second notification interface, S304 is performed.

S304. The terminal determines, in the VR mode, second location information based on the first location information, so that the 2D application responds to the user operation based on the second location information, where the second location information is location information on the first notification interface.

Specifically, the first location information is 3D coordinates of the user operation point, and the second location information is 2D coordinates on the first notification interface that are corresponding to the 3D coordinates. In a possible embodiment, the terminal maps a location indicated by the 3D coordinates of the touch point to a location indicated by the 2D coordinates, and the terminal obtains the location indicated by the current 2D coordinates. The terminal simulates, based on the location indicated by the 2D coordinates, an operation instruction for touching the 2D application. The touch module in the processor 180 shown in FIG. 2 responds to the operation instruction, and the 2D application performs a corresponding operation according to the operation instruction. Mapping in this process may be understood as an inverse process of S302. That is, in the VR mode, the 3D model of the touch point is mapped onto the 2D interface.

The terminal projects the interface of the 2D application onto the 3D screen of the VR glasses. Specific effect views may be shown in FIG. 5(a) and FIG. 5(b).

Figure 4:
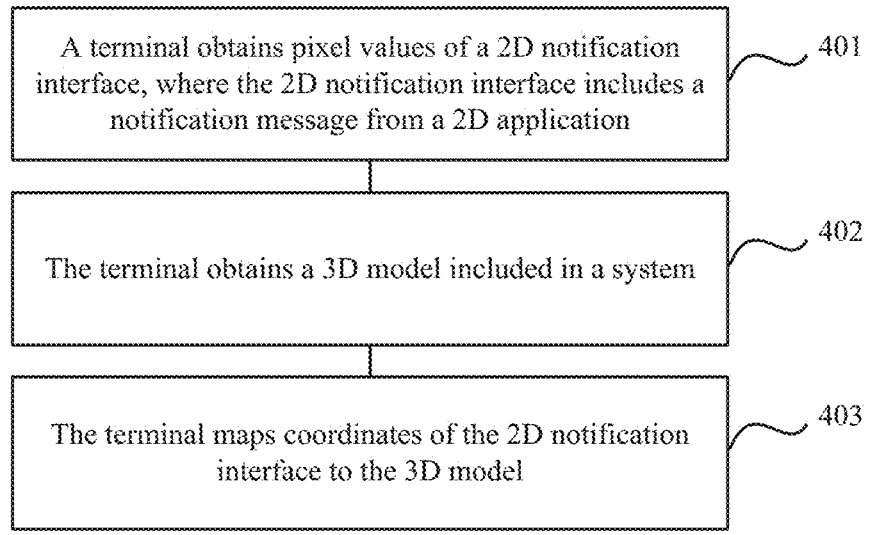
FIG. 4 is a schematic flowchart of a mapping principle according to an embodiment of the present invention.
Figure 5A:
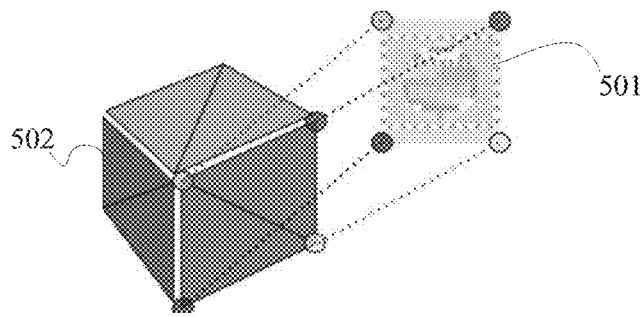
FIG. 5(a) and FIG. 5(b) are schematic structural diagrams of a mapping principle according to an embodiment of the present invention.
Figure 5B:
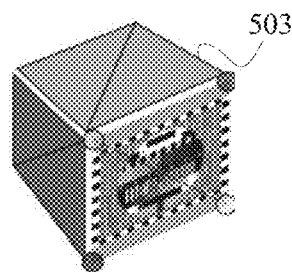

FIG. 4 is a schematic flowchart of a mapping principle according to an embodiment of the present invention. For mapping in the foregoing descriptions, a mapping principle is described in detail with reference to FIG. 2, FIG. 5(a), and FIG. 5(b). FIG. 5(a) and FIG. 5(b) are schematic structural diagrams of the mapping principle according to this embodiment of the present invention. Mapping a 2D notification interface to a 3D interface in a VR mode includes the following steps.

S401. A terminal obtains coordinates of the 2D notification interface, where the 2D notification interface includes a notification message from a 2D application.

Specifically, the surface flinger module in the processor 180 shown in FIG. 2 obtains the coordinates of the 2D notification interface. As shown in FIG. 5(a), 501 is the interface of the 2D application, and a cube 502 is a 3D model corresponding to the 2D application display interface.

S402. The terminal obtains a 3D model included in a system.

Specifically, the terminal determines the 3D model, as shown by the cube 502 in FIG. 5(a) and FIG. 5(b), of the 2D notification interface in the system based on the coordinates of the 2D notification interface.

S403. The terminal maps the coordinates of the 2D notification interface to the 3D model.

Specifically, the coordinate values of the 2D notification interface in S401 may be mapped to the 3D model. This process may be shown in FIG. 5(b). The terminal maps, in the VR mode, the first notification interface to some or all areas of the 3D model.

For example, mapping may also be understood as follows: Three-dimensional coordinates (for example, 3D coordinates) and two-dimensional coordinates (for example, the coordinates of the 2D notification interface) may form a 3D-2D coordinate pair. Then, a process for calculating the 2D coordinates corresponding to the three-dimensional coordinates P is shown by equations (1), (2), and (3). In the equation (1), R is a 3*3 orthogonal rotation matrix, and t is a 3*1 translation vector. Because coordinates of a virtual object in a VR device are known, values of R and t in the equation (1) are known.

$$T = \begin{bmatrix} R & t \\ 0 & 1 \end{bmatrix} \qquad (1)$$

The orthogonal rotation matrix R in the equation (1) may be represented by using three 3*1 column vectors, as shown in the equation (2):

$$R = [r1 \ r2 \ r3] \qquad (2)$$

In this case, homogeneous coordinates $\bar{p}$ of a point p, in a two-dimensional image, to which the three-dimensional coordinates P (X,Y,0) on a 3D plane is projected may be represented by using the equation (3):

$$\bar{p} = [K \ 0] * [r_1 \ r_2 \ r_3] * \begin{bmatrix} X \\ Y \\ 0 \end{bmatrix} + t \qquad (3)$$

-continued $$= [K \ 0] * [r_1 \ r_2] * \begin{bmatrix} X \\ Y \end{bmatrix} + t$$

$$= [K \ 0] * \begin{bmatrix} [r_1 \ r_2] & t \\ 0 & 1 \end{bmatrix} * \begin{bmatrix} X \\ Y \\ 1 \end{bmatrix}$$

$$= [K * [r_1 \ r_2] \ K * t] * \begin{bmatrix} X \\ Y \\ 1 \end{bmatrix}$$

At this time, transformation H between any point in an image outside a display screen of a smart device (for example, a mobile phone) and the any point in a two-dimensional image displayed on a head-mounted device (for example, VR glasses) may be indicated by a 3*3 matrix represented by using an equation (4):

$$H=[K*[r_1 \ r_2]K*t] \quad (4)$$

Similarly, $H^{-1}$ may be calculated to obtain the three-dimensional coordinates P corresponding to the any point p on a two-dimensional plane.

Figure 6:
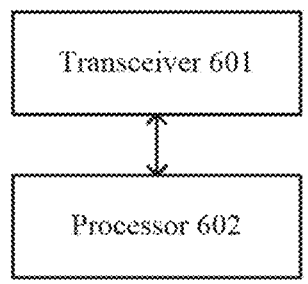
FIG. 6 is a schematic structural diagram of another terminal according to an embodiment of the present invention.

FIG. 6 is a schematic structural diagram of another terminal according to an embodiment of the present invention. As shown in FIG. 6, the terminal includes a transceiver 601, a processor 602, and a display.

The transceiver 601 is configured to determine, in a VR mode, a notification message, where the notification message is from a 2D application.

The processor 602 is configured to determine a 2D notification interface, where the 2D notification interface includes the notification message.

The processor 602 is further configured to determine, in the VR mode, a second notification interface based on the first notification interface.

The display is configured to display, in the VR mode, the second notification interface.

The processor 602 is further configured to determine, in the VR mode, a user operation, where a touch point of the user operation is located on the second notification interface, and location information of the touch point on the second notification interface is first location information. The processor is further configured to determine, in the VR mode, second location information based on the first location information, so that the 2D application responds to the user operation based on the second location information, where the second location information is location information on the first notification interface.

The transceiver 601 is further configured to: project the user operation interface onto a 3D interface of VR glasses, and determine, in the VR mode, the notification message, where the notification message is from the 2D application.

The processor 602 is further configured to: determine the first notification interface in a normal mode, where the first notification interface includes the notification message and map the first notification interface to a 3D model, to determine the second notification interface.

The processor is further configured to map, in the VR mode, the first notification interface to some or all areas of the 3D model.

The processor 602 is further configured to: map 3D coordinates of the touch point of the user operation to 2D coordinates on the first notification interface, and respond to the user operation based on a location indicated by the 2D coordinates on the first notification interface. The first location information is the 3D coordinates of the touch point, and the second location information is the 2D coordinates on the first notification interface.

The processor 602 maps the first location information to the 3D model in the VR mode, to obtain 3D data, and projects the 3D data into the VR glasses. Through this process, a 2D application on a terminal supporting a VR technology can be displayed in a 2D mode.

The processor is further configured to determine, in the VR mode, the 2D coordinates on the first notification interface by mapping the 3D coordinates.

FIG. 7 is an implementation effect view of displaying a 2D application in a VR device according to an embodiment of the present invention. As shown in FIG. 7, a user performs a touch operation on a 2D application interface by using an external device (for example, a Bluetooth handle or a VR handle), and a terminal maps 3D coordinates of a location, in a 3D model, of a touch point of the user operation to coordinates on the 2D notification interface. The terminal determines the 2D coordinates on the 2D notification interface, and simulates, based on the 2D coordinates on the 2D notification interface, a touch operation on a 2D application corresponding to the 2D notification interface, so that the 2D application responds to the touch operation of the user According to mapping of the 2D application to 3D display, the terminal can project an entire operation process onto a screen of VR glasses, and the VR glasses can provide 3D effect for the user to view.

All or some of the foregoing embodiments may be implemented by using software, hardware, firmware, or any combination thereof. When software is used for implementation, all or some of the foregoing embodiments may be implemented in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a Solid State Disk (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A system comprising:
   a controller;
   virtual reality (VR) glasses; and
   a mobile phone that is detachably couplable to the VR glasses and that is coupled to the controller, wherein the mobile phone is configured to:
   determine whether the mobile phone is in a VR mode or a normal mode; and
   when the mobile phone is in the VR mode:
      receive a notification message from an application installed on the mobile phone, wherein the notification message is designated to be displayed by a first user interface in the normal mode;
      generate, based on the first user interface, a second interface for displaying the notification message in the VR mode;
      display the second interface in the VR mode;
      receive a first user input corresponding to a first location on the second interface;
      determine a second location on the first user interface corresponding to the first location on the second interface by calculating two-dimensional coordinates of the second location based on three-dimensional coordinates of the first location in response to the first user input; and
      respond to the first user input based on the second location for interacting with the notification message.

2. The system of claim 1, wherein the mobile phone is further configured to:
   receive a second user input when the mobile phone is in the normal mode;
   determine whether the mobile phone is coupled to the VR glasses in response to the second user input; and
   change a mode of the mobile phone from the normal mode to the VR mode when the mobile phone is coupled to the VR glasses.

3. The system of claim 1, wherein the second interface is generated by mapping the first user interface to a three-dimensional model.

4. The system of claim 3, wherein the first user interface is mapped on a surface of a three-dimensional model.

5. The system of claim 3, wherein the mobile phone is further configured to store the three-dimensional model.

6. The system of claim 1, wherein the mobile phone is further configured to:
   receive the notification message when the mobile phone is in the normal mode; and
   display the first user interface in the normal mode.

7. A system comprising:
   virtual reality (VR) glasses;
   an electronic device detachably couplable to the VR glasses and configured to:
   determine whether the electronic device is in a VR mode or a normal mode;
   when the electronic device is in the VR mode:
      receive a notification message from an application installed on the electronic device, wherein the notification message is designated to be displayed by a first user interface in the normal mode;
      generate, based on the first user interface, a second interface for displaying the notification message in the VR mode;
      display the second interface in the VR mode;
      receive a first user input corresponding to a first location on the second interface;
      determine a second location on the first user interface corresponding to the first location on the second interface by calculating two-dimensional coordinates of the second location based on three-dimensional coordinates of the first location in response to the first user input corresponding to the first location on the second interface; and
      respond to the first user input based on the second location for interacting with the notification message.

8. The system of claim 7, wherein the electronic device is further configured to:
   receive a second user input when the electronic device is in the normal mode;
   determine whether the electronic device is coupled to the VR glasses in response to the second user input; and
   change a mode of the electronic device from the normal mode to the VR mode when the electronic device is coupled to the VR glasses.

9. The system of claim 7, wherein the second interface is generated by mapping the first user interface to a three-dimensional model.

10. The system of claim 9, wherein the electronic device is further configured to store the three-dimensional model.

11. An electronic device comprising:
    a display;
    a processor coupled to the display; and
    a memory coupled to the processor and comprising instructions that when executed by the processor, cause the electronic device to:
    determine whether the electronic device is in a virtual reality (VR) mode or a normal mode;
    when the electronic device is in the VR mode:
       receive a notification message from an application installed on the electronic device, wherein the notification message is designated to be displayed by a first user interface in the normal mode;
       generate a second interface based on the first user interface, wherein the second interface is configured to display the notification message in the VR mode;
       display the second interface in the VR mode;
       receive a first user input corresponding to a first location on the second interface;
       determine a second location on the first user interface corresponding to the first location on the second interface by calculating two-dimensional coordinates of the second location based on three-dimensional coordinates of the first location in response to the first user input corresponding to the first location on the second interface; and
       respond to the first user input based on the second location for interacting with the notification message.

12. The electronic device of claim 11, wherein the instructions, when executed by the processor, further cause the electronic device to:
    receive a second user input when the electronic device is in the normal mode;
    determine whether the electronic device is coupled to VR glasses in response to the second user input; and
    change a mode of the electronic device from the normal mode to the VR mode when the electronic device is coupled to the VR glasses.

13. The electronic device of claim 11, wherein the second interface is generated by mapping the first user interface to a three-dimensional model.

14. The electronic device of claim 13, wherein the first user interface is mapped on a surface of a three-dimensional model.

15. The electronic device of claim 13, wherein the three-dimensional model is stored in the electronic device.

16. The electronic device of claim 11, wherein the instructions, when executed by the processor, further cause the electronic device to:
   receive the notification message when the electronic device is in the normal mode; and
   display the first user interface in the normal mode.

\* \* \* \* \*